Sept. 24, 1968  K. FRANK ET AL  3,403,051
SHEATHING COMPOSITION CONTAINING FERROSILICON
PARTICLES FOR WELDING ELECTRODES
Filed Dec. 17, 1963  2 Sheets-Sheet 1
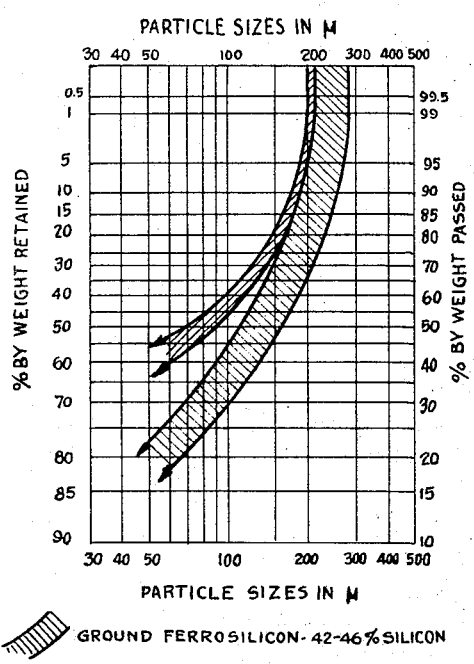
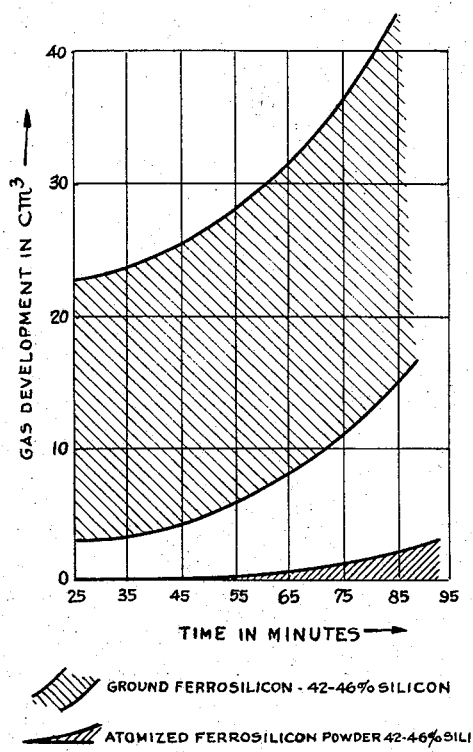
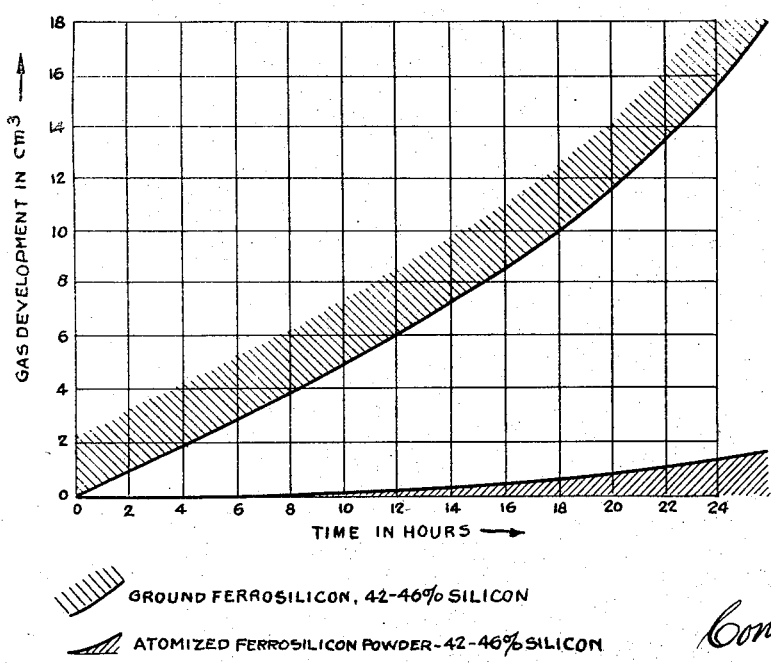
INVENTOR
Klaus Frank
Hans Ebert
Helmut Klee
Connolly and Hutz
ATTORNEYS

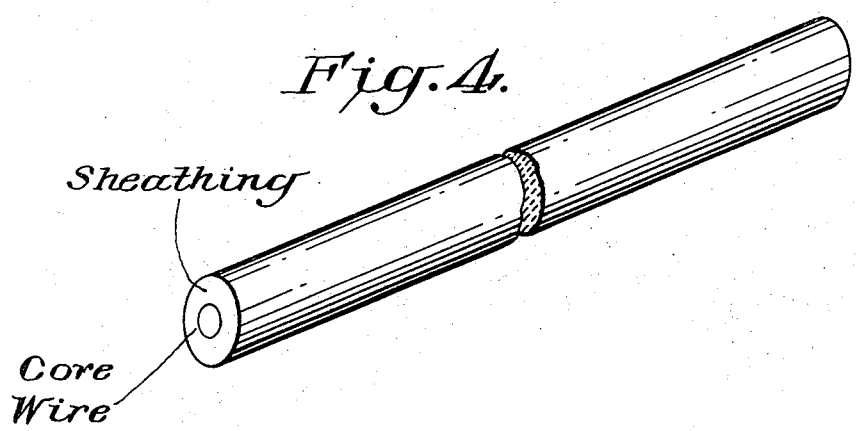

United States Patent Office 3,403,051
Patented Sept. 24, 1968

3,403,051
SHEATHING COMPOSITION CONTAINING FERROSILICON PARTICLES FOR WELDING ELECTRODES
Klaus Frank, Hans Ebert, and Helmut Klee, Knapsack, near Cologne, Germany, assignors to Knapsack-Griesheim Aktiengesellschaft, Knapsack, near Cologne, Germany, a corporation of Germany
Continuation-in-part of application Ser. No. 144,113, Oct. 10, 1961. This application Dec. 17, 1963, Ser. No. 331,144
Claims priority, application Germany, Oct. 11, 1960, K 41,859; Aug. 16, 1961, K 44,515
9 Claims. (Cl. 117—206)

The present invention relates to an additive of ferrosilicon for the manufacture of sheathing masses for extruded types of welding electrodes, and is a continuation-in-part of U.S. patent application Ser. No. 144,113, filed Oct. 10, 1961, now abandoned.

In the manufacture of sheathing masses for extruded types of welding electrodes the alloying constituents are generally used in the form of ferroalloys of the metals concerned, for example ferrochromium or ferromanganese. Ferrosilicon is used as silicon carrier.

Ferrosilicon, however, tends to evolve gases, especially in the presence of water or aqueous alkali metal solutions. Such an evolution of gas, which may also occur in the sheathing mass, considerably disturbs the manufacture of welding electrodes. Therefore, various processes have been developed for passivating ground ferrosilicon powder by degassing it in water, treating it under reduced pressure or with chromates.

It has now been found that atomized ferrosilicon, for example, evolves no or only very little gas with water or aqueous alkali solutions and that in any case the gas evolution is smaller than that of a ground material having the same composition. Thus atomized ferrosilicon is especially suitable as silicon-containing additive for the manufacture of sheathing masses, provided that its composition is adapted to the desired application.

Ground ferrosilicon contains a smaller proportion of fine grains than the atomized ferrosilicon. Moreover, the shape of the grains of atomized ferrosilicon essentially differs from that of the ground alloy. The ground alloy consists of cornered and edged particles while the atomized ferrosilicon, which is obtained from molten material is composed of particles which have a round and mostly spherical shape and a smooth surface. Atomized ferrosilicon has a lower tendency to corrosion than ground ferrosilicon.

Tests carried through have surprisingly revealed that atomized ferrosilicon is especially suitable for the manufacture of sheathing masses with the use of the usual aqueous solution of water glass.

Tests have revealed that it is not the atomization as such that causes the passivity of the ferrosilicon particles, but that passivity is generally very pronounced in ferrosilicon particles, which have been obtained in round and finely divided form by solidification, for example by finely dividing and chilling of a melt. Consequently, there can be used as additive for the manufacture of sheathing masses for extruded types of electrodes not only atomized particles but also particles obtained in round form by granulation or particles round-melted on the surface, for example by passing them through a flame zone.

When the particles are allowed to solidify in finely divided form directly from the melt, a maximum passivity is surprisingly reached which is much higher that that of particles ground in solid state.

More particularly, tests carried out within the scope of the present invention showed that not only atomized ferrosilicon has the properties required for the manufacture of extruded types of electrodes. It is possible to produce a ferrosilicon alloy having the aforesaid properties also by transforming such an alloy by known methods, for example on a granulating disk, directly from the melt into a powder. Quite generally, the present invention relates to an additive for the manufacture of sheathing masses for extruded types of welding electrodes whereby the ferrosilicon component used has a smooth round surface, and has been transformed from the melt into a powder by atomization or granulation with steam, air, water, $CO_2$, or nitrogen. Besides, any other process for the conversion of a metal into a powder from the melt can be used, provided that the solidification takes place very rapidly and that prior to and at the latest during said period the division of the metal into small particles is carried through and completed. As already stated, a granulating disk can be employed with the use of water, or it is possible to use granulating grooves with high water pressure, as well as water nozzzles or air currents. Care must be taken, however, that the ranges of particle sizes of the comminuted ferrosilicon correspond to the size desired for the manufacture of electrodes. The grain composition should be approximately the following.

| Millimeters: | Percent by wt. |
|---|---|
| >0.2 | 0.1 |
| 0.15–0.2 | 10–30 |
| 0.10–0.15 | 12–20 |
| 0.075–0.10 | 13–15 |
| 0.06–0.075 | 10–14 |
| <0.06 | 25–50 |

It is advantageous when about 50% of the ferrosilicon powder has a grain size of less than 0.06 mm., since this high proportion of small grains guarantees a very good distribution of the ferrosilicon in the sheathing mass for electrodes.

More particularly, the present invention consists in using as additive of ferrosilicon for the manufacture of sheathing masses for extruded types of electrodes ferrosilicon components which are prepared in finely divided and round form with a smooth surface by solidification from the melt. It is of advantage to use ferrosilicon having a silicon content in the range from 40 to 80% by weight. In general, ferrosilicon is used having a silicon content of 40–50% by weight, for example 42–46% by weight, and 70–80% by weight, for example 75% by weight. It is of advantage when in the additive at least 25% by weight and preferably about 50% by weight of the round and finely divided ferrosilicon particles have a grain size of less than 0.06 mm. A grain composition as indicated above is especially suitable. The ferrosilicon particles can be spherical, drop-shaped or elongated.

According to a further feature of the present invention the ferrosilicon component consists of atomized ferrosilicon which is obtained by atomization from the melt. The ferrosilicon melt which is produced, for example, by an electrothermal method is atomized with the aid of water, steam, air or nitrogen, under a pressure of about 1 to 12 atmospheres gauge of the liquid, gaseous or vaporous media. The melt of the ferrosilicon has a temperature in the range of about 1200 to 1600° C.

The finely divided round ferrosilicon particles can likewise be obtained by directly converting the melt of the ferrosilicon alloy into a powder on a granulating disk, preferably with water as comminuting and chilling agent. Still further the round, finely divided ferrosilicon particles can be directly obtained from the melt of the ferrosilicon alloy in a granulating groove, preferably when using water and/or air as comminuting agent for the melt and as chilling agent. The comminuting and/or chilling agents, which comprise, besides water and air, also steam or nitrogen, have a pressure of about 1 to 20 atmospheres gauge. They may be applied through nozzles.

A further method for the manufacture of an additive of round and finely divided ferrosilicon particles consists in grinding lumpy solid ferrosilicon in known manner, passing hte fine particles obtained in known manner and if desired under pressure and with the aid of an atomization agent through a heating zone, for example a flame zone, where at least the surface of the particles is melted and rounded, and solidifying the particles in a subsequent cooling or chilling zone.

Sheathed welding electrodes usually consist of a core wire and a sheathing composition surrounding the core wire like a jacket. The core wire furnishes the welding material; its composition must therefore be adapted to the intended use, i.e., to the material to be welded. In many cases, it has proved advantageous to use unalloyed steel low in carbon for making the core wire and to incorporate the alloy addition into the sheathing composition. Inasmuch as sheathed welding electrodes for welding high alloy steels, for example chrome-nickel steels, are concerned, it is, however, preferred to use core wires having the same or a similar composition as the steel to be alloyed. The electrode sheath is intended to form a slag adapted to the liquid welding material. This means that the sheath is required to contain the basic material necessary to achieve that effect. The slag should be composed to wet and thereby protect the metal droplets on being passed through the arc and to ultimately cover the hot melt. After cooling, the slag should be easy to remove from the solidified melt. The sheathing composition should also contain the necessary proportions of deoxidizing and accordingly of alloying agents. Furthermore, the sheathing composition should enable the arc to be stabilized and the liquid metal to be prevented from absorbing atmospheric nitrogen. Oxygen, which may have been absorbed, can be bound by the incorporated deoxidizing agent, but nitrogen cannot subsequently be removed.

Various sheathing compositions are known which can be classified into ore-acid, lime-basic and titanium acid compositions. Depending on the addition of iron powder, the art also distinguishes between high performance electrodes in which up to 50% of the sheathing composition may be iron powder.

Still further, there are lime-basic electrodes in which ferrosilicon as a deoxidizing agent and ferromanganese are used in powder form, alone or in combination. The sheathing composition consists here of about 25 to 35% $CaF_2$, 25 to 35% $CaCO_3$, 0.5 to 12% ferrosilicon (FeSi) containing 45 to 75% silicon, 0 to 12% ferromanganese containing 80% manganese, 10 to 25% Fe and 8 to 15% of a binding agent. The binding agent may be prepared from mineral material and may contain water glass, or may be based on organic material, for example carbon hydrate. Mixtures of organic material with mineral material may also be used for making the binding agent.

The invention is concerned in one aspect with an electrode the basic composition of which corresponds to that indicated in the preceding example with the exception tht the normally ground FeSi is replaced with atomized FeSi. Atomized FeSi has a grain structure other than ground FeSi, i.e., it is more finely divided. The larger proportion of fine material in atomized FeSi permits the deoxidizing agent to be better distributed.

The basic electrode of this aspect of the invention is of the lime-basic type and composed of 25 to 35% $CaF_2$, 25 to 35% $CaCO_3$, 0.5 to 12% FeSi in finely divided round form and with a smooth surface containing 45 to 75% Si, 0 to 12% ferromanganese containing 80% manganese, 10 to 25% Fe, 8 to 15% binding agent, at most 5% of which is organic substance, whereas the bulk thereof is a water glass solution of sodium potassium silicate. The electrode tested and encompassed by this typical range was composed of 29% $CaF_2$, 29% $CaCO_3$, 12% FeSi in finely divided round form and with a smooth surface containing 45% Si, 2% FeMn (80% Mn), 14% iron, 3% organic binding agent and 11% sodium-potassium water glass solution.

FIGURE 4 illustrates a welding electrode of the type contemplated. The core wire of suitable composition depending on the material to be welded is surrounded by and adhered to by a sheathing material. The sheathing material contains the novel additive of the instant invention.

FIGURE 1 illustrates the characteristic ranges of particle sizes of atomized and ground ferrosilicon. The figure shows the smaller proportion of fine grains in the ground ferrosilicon compared to the atomized ferrosilicon.

The problem was to find a testing method which substantially adapted to practical requirements permit measuring the gas evolution occurring when ferrosilicon is mixed with an aqueous solution of water glass.

Since it is difficult to measure the volume of gas evolved in the very viscous water glass, the gas evolution was determined in water and in n/10 potassium or sodium hydroxide solution at 20° C. and 70° C. The weighed portion was always 10 grams of ferrosilicon powder having a silicon content of 42–46% by weight.

The tests could be restricted to ferrosilicon of 42–46%, since this grade has a higher tendency to evolve gas than the grades containing a greater proportion of silicon.

(a) Gas evolution in water

Neither ground ferrosilicon powder of 42–46% Si nor atomized ferrosilicon powder of 42–46% Si evolve any gas after 24 hours in water.

(b) Gas evolution in n/10 lye 10 grams of ferrosilicon of 42–46% Si evolved after 24 hours in n/10 lye consisting of 4 parts of KOH and 6 parts of NaOH the following volumes of gas:

Atomized ferrosilicon powder _____cm.$^3$__ 0.0 to 1.1
Ground ferrosilicon powder _____cm.$^3$__ 15.4

FIGURE 2 illustrates the gas evolution in cm.$^3$ as a function of time at 20° C. in an aqueous n/10 lye consisting of 4 parts of KOH and 6 parts of NaOH.

In the following Table I are recited the values of the gas evolution measured in n/10 lye at 70° C. for 10 grams of ferrosilicon:

TABLE I

| Material | Gas evolution in cm.$^2$ after— | | |
|---|---|---|---|
| | 25 mins. | 55 mins. | 85 mins. |
| Atomized ferrosilicon powder 42–46%, grade A | 0.0 | 0.0 | 0.0 |
| Atomized ferrosilicon powder 42–46%, grade B | 0.0 | 0.0 | 1.6 |
| Ground ferrosilicon powder 42–46%, grade C | 2.7 | 4.6 | 13.8 |
| Ground ferrosilicon powder 42–46%, grade D | 23.0 | (¹) | (¹) |
| Ground ferrosilicon powder 42–46%, grade E | 3.6 | 6.0 | 18.5 |

¹ Over 30.

The various grades A to E have been obtained by various tappings. The diagram of these values represented in FIGURE 3 illustrates more distinctly that the atomized ferrosilicon evolves a considerably smaller volume of gas than ground ferrosilicon having an analogous composition, that is to say that the former is much more passivated than the latter.

When gas is evolved in the sheathing mass, owing to the reaction of ferrosilicon with the aqueous solution of the binder, difficulties occur in the manufacture of the sheathing masses, which lead to an increase of the amount of pressure applied on sheathing the welding electrodes, a detachment of the sheathing mass from the core wire, and blisterings in the sheathing mass.

For judging the behaviour of the sheathed electrodes manufactured with the additive of the invention, welding tests were carried out with several extruded types of electrodes manufactured under identical conditions. In some electrodes the sheathing mass contained atomized ferrosilicon and in the others it contained ground ferrosilicon having the same composition.

In the manufacture of welding electrodes with atomized ferrosilicon in the sheathing mass, the bath is liquid, more easily to manipulate and has better properties of treatment. The slag is less viscous, follows the bath more readily and can be removed more easily. The welding electrodes have a better ignitability, they burn almost without spatters and the burning of the arc is more stable.

For determining the spraying losses each time 10 electrodes of either type were applied to 3 plates each (150x 250x10 mm.³) which had been weighed and sandblasted, the seam sides were covered with asbestos and the spatters were removed after each layer. The plates with the applied beads were then weighed again.

An output of 112.7% was determined for B-electrodes and of 111.5% for E-electrodes. For 30 electrodes the difference of the spraying losses is thus 14.8 g. at the expense of the E-electrode.

The sheathing mass of the B-electrode contains atomized ferrosilicon of grade B and the E-electrode contains ground ferrosilicon of grade E.

The results obtained are recited in the following Table II:

It results from the above examples that the high degree of passivation of atomized ferrosilicon can also be reached by granulating ferrosilicon on a granulating disk. The comminution in the molten state produces such a high stabilization that the smaller particles are more strongly passivated, while with ground ferrosilicon the tendency to corrosion increases as the grain diameter diminishes.

The present invention is not necessarily limited to the specific embodiments and teaching above, but also include embodiments not specifically taught but which come within the scope of the attached claims.

We claim:

1. A welding electrode comprising a core wire, and a sheathing material surrounding and adhered to said core wire, the sheathing material containing as an additive ferrosilicon particles with 40 to 80 percent by weight silicon, in finely divided round form and with a smooth surface, at least 25 percent by weight of the ferrosilicon particles having a grain size of less than 0.06 mm.

2. A welding electrode according to claim 1 wherein the additive contains about 40 to 50 percent by weight of silicon.

3. A welding electrode according to claim 1 wherein the additive contains about 70 to 80 percent by weight of silicon.

TABLE II

| Plate | Type of electrodes | Number of electrodes | Weight of plates prior/after application (g.) | | Weight of core wire melted off (g.) | Applied welding material (g.) | Difference output | |
|---|---|---|---|---|---|---|---|---|
| | | | | | | | (g.) | (g.) |
| 1 | B | 10 | 3.170 | 3.607 | 391.4 | 437 | | |
| 2 | B | 10 | 3.165 | 3.619 | 396.5 | 454 | | |
| 3 | B | 10 | 3.160 | 3.601 | 393.8 | 441 | | |
| | | | | | 1,181.7 | 1,332 | +150.3 | 112.7 |
| 4 | E | 10 | 3.045 | 3.504 | 395.9 | 459 | | |
| 5 | E | 10 | 3.030 | 3.465 | 393.8 | 435 | | |
| 6 | E | 10 | 3.042 | 3.468 | 394.8 | 426 | | |
| | | | | | 1,184.5 | 1,320 | +135.5 | 111.5 |
| | | | | | | | | 14.8 |

Amperage 155 A. B=ferrosilicon 42–46% atomized. E=ferro-silicon 42–46% ground. Length of electrodes 450 mm. Diameter of electrodes 4 mm.

It is obvious from tests that the use of atomized ferrosilicon for the sheathing mass improves the welding properties of the electrodes and reduces the spraying losses. Furthermore, the particles of atomized ferrosilicon are distinctly passive and very stable towards water and lyes, for example NaOH or KOH, and water glass.

The grains of ferrosilicon which have been prepared by granulation have a smooth surface and an almost perfect spherical shape. On account of the smooth surface ferrosilicon powder solidified from the melt has a very low tendency to corrosion. The tendency to corrosion was determined for ferrosilicon produced from the melt by granulation, ferrosilicon produced from the melt by atomization and ground ferrosilicon powder. The gas evolution was measured as a function of the grain size in an aqueous n/10 lye consisting of 4 parts of KOH and 6 parts of NaOH at 70° C. The following values were obtained:

4. A welding electrode according to claim 1 wherein the additive contains about 42 to 46 percent by weight of silicon.

5. A welding electrode according to claim 1 wherein the additive contains about 75 percent by weight of silicon.

6. A welding electrode comprising a core wire, and a sheathing material surrounding and adhered to said core wire, the sheathing material comprising the following ingredients:

| | Percent by wt. |
|---|---|
| $CaF_2$ | 25 to 35 |
| $CaCO_3$ | 25 to 35 |
| Ferromanganese | 0 to 12 |
| Fe | 10 to 25 |
| Binding agent | 8 to 15 |
| FeSi | 0.5 to 12 |

TABLE III

| Type of ferrosilicon (45% of Si) | Grain size, mm. | Gas development in cm.³ after— | | |
|---|---|---|---|---|
| | | 25 mins. | 55 mins. | 85 mins. |
| From the melt by granulation | 0.15–0.20 | 0.0 | 0.9 | 2.1 |
| | 0.10–0.15 | 0.0 | 0.4 | 1.0 |
| | 0.06–0.10 | 0.0 | 0.0 | 0.5 |
| | <0.06 | 0.0 | 0.0 | 0.0 |
| From the melt by atomization | 0.15–0.20 | 0.0 | 0.0 | 1.8 |
| | 0.10–0.15 | 0.0 | 0.0 | 0.8 |
| | 0.06–0.10 | 0.0 | 0.0 | 0.0 |
| | <0.06 | 0.0 | 0.0 | 0.0 |
| Ground | 0.15–0.20 | 2.5 | 6.4 | 10.0 |
| | 0.10–0.15 | 3.0 | 7.5 | 11.5 |
| | 0.06–0.10 | 6.0 | 9.5 | 21.0 |
| | <0.06 | 11.0 | 18.5 | >30.0 | wherein the FeSi is in finely divided round form and with a smooth surface and contains 45 to 75 percent Si.

7. A welding electrode according to claim 6 wherein the sheathing material comprises the following ingredients:

| | Percent by wt. |
|---|---|
| CaF$_2$ | 29 |
| CaCO$_3$ | 29 |
| Ferromanganese | 2 |
| Fe | 14 |
| Binding agent | 3 |
| Sodium-potassium water glass solution | 11 |
| FeSi | 12 |

8. A sheathing material for welding electrodes comprising:

| | Percent by wt. |
|---|---|
| CaF$_2$ | 25 to 35 |
| CaCO$_3$ | 25 to 35 |
| Ferromanganese | 0 to 12 |
| Fe | 10 to 25 |
| Binding agent | 8 to 15 |
| FeSi | 0.5 to 12 | wherein the FeSi is in finely divided round form and with a smooth surface and contains 45 to 75 percent Si.

9. A sheathing material for welding electrodes according to claim 8 comprising:

| | Percent by wt. |
|---|---|
| CaF$_2$ | 29 |
| CaCO$_3$ | 29 |
| Ferromanganese | 2 |
| Fe | 14 |
| Binding agent | 3 |
| Sodium-potassium water glass solution | 11 |
| FeSi | 12 |

References Cited

UNITED STATES PATENTS

| | | | |
|---|---|---|---|
| 2,037,596 | 4/1936 | Schaub | 117—206 |
| 2,730,465 | 1/1956 | Van Der Willigen | 117—206 |
| 2,878,518 | 3/1959 | Klee | 252—60 X |
| 3,029,165 | 4/1962 | Kihlgren | 117—206 |
| 3,235,405 | 2/1966 | Quaas | 117—206 |

ALFRED L. LEAVITT, *Primary Examiner.*

RALPH KENDALL, *Examiner.*

A. M. GRIMALDI, *Assistant Examiner.*